June 19, 1945.  A. C. DURDIN, 3D  2,378,757
COMMINUTING METHOD AND APPARATUS
Filed Dec. 22, 1941    4 Sheets-Sheet 3
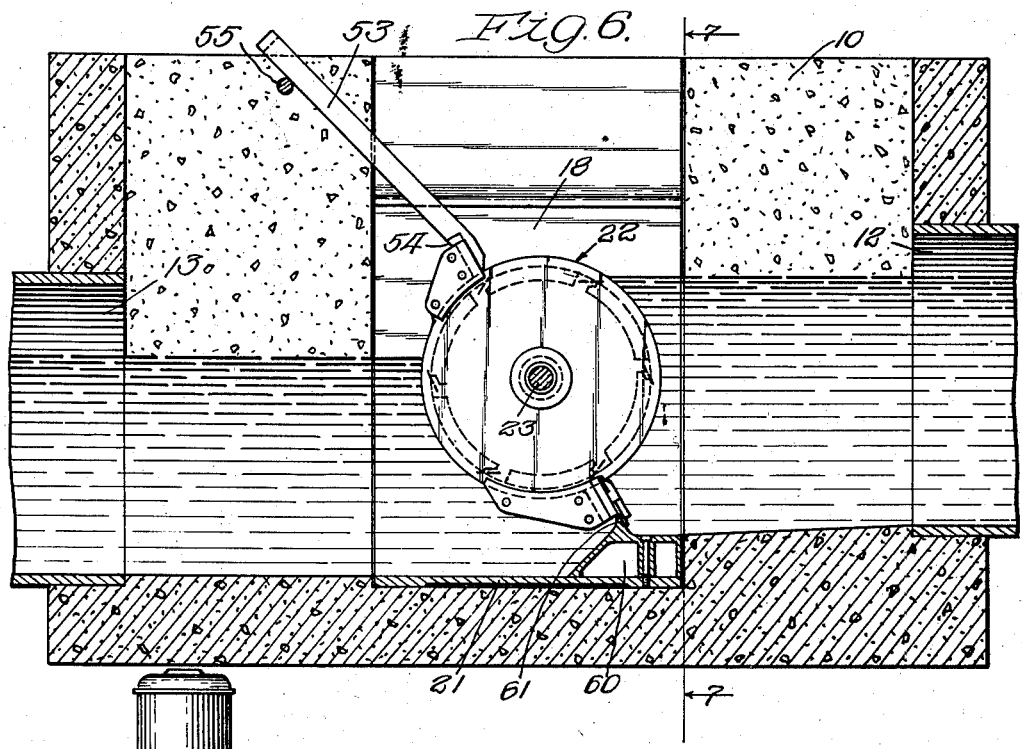
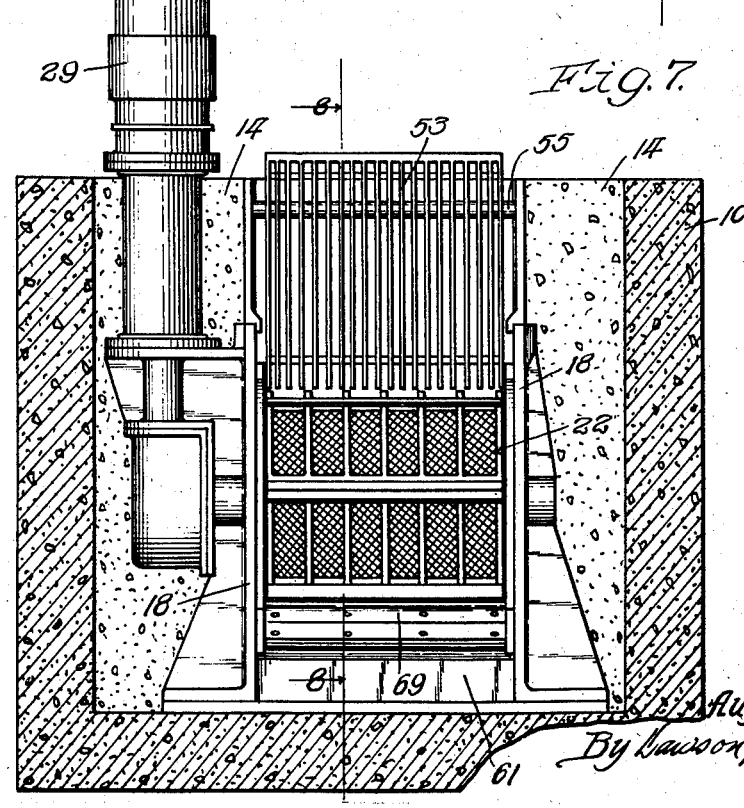
Inventor.
Augustus C. Durdin, III,
By Lawson, Coms & Booth,
Attys.

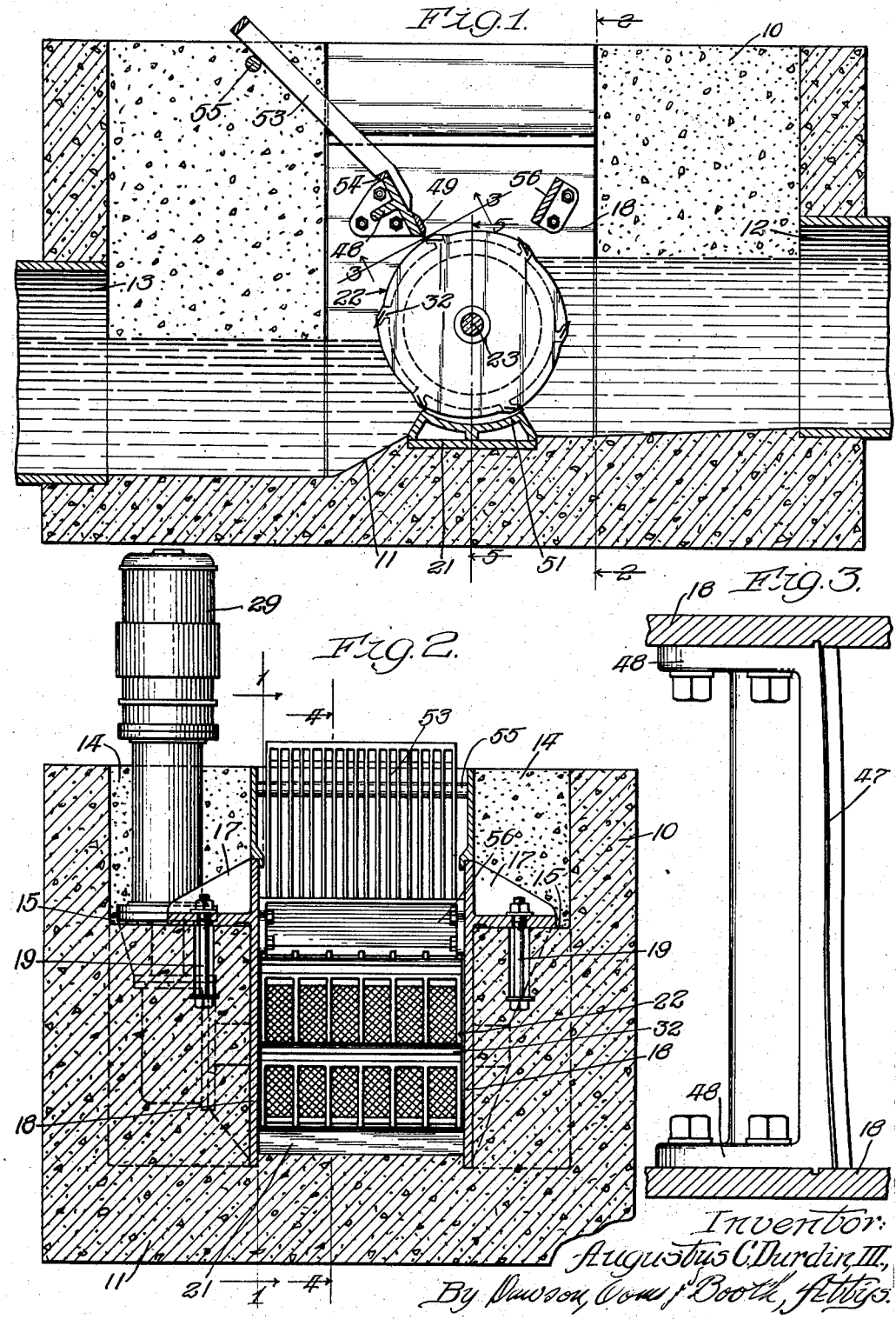

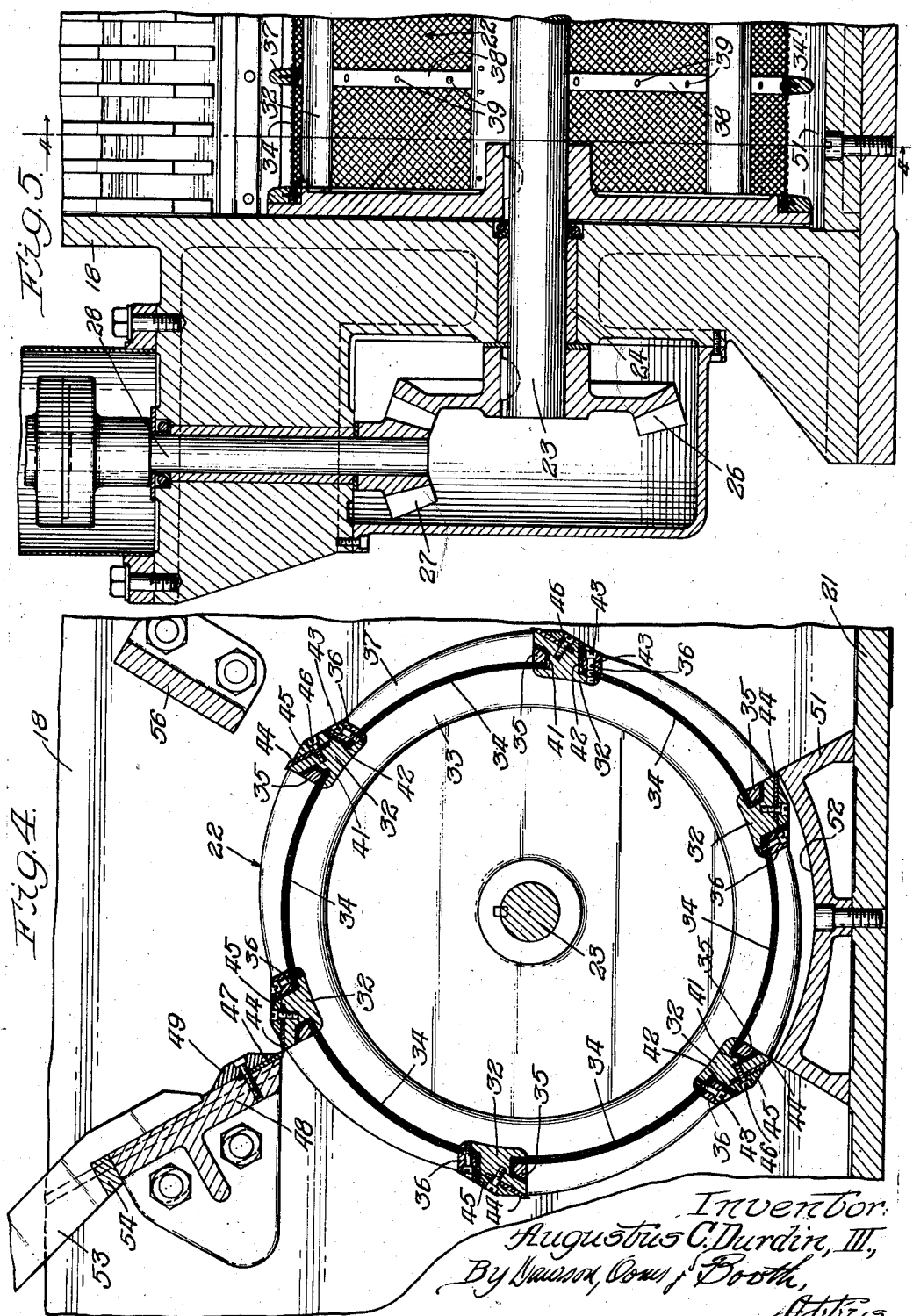

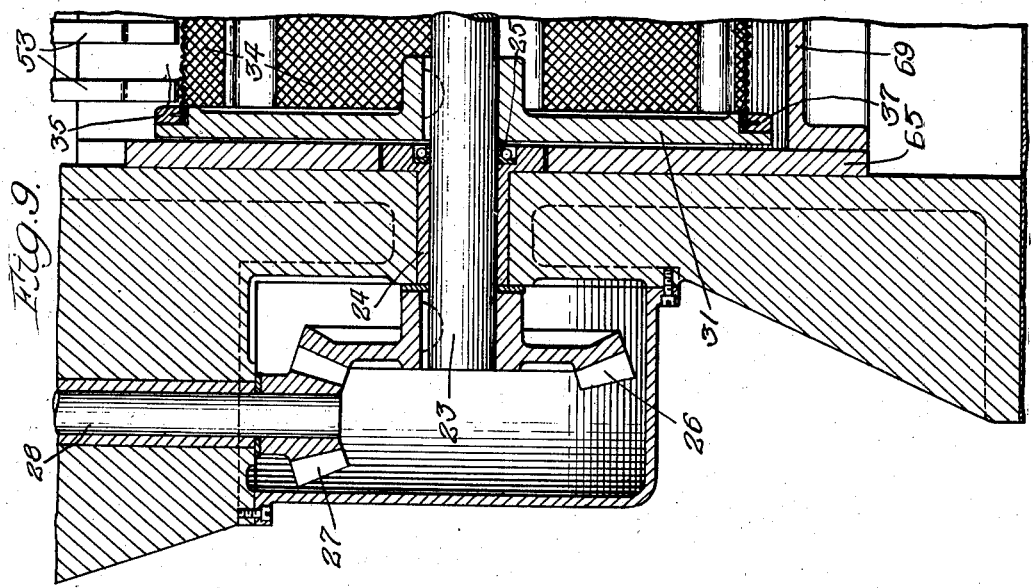
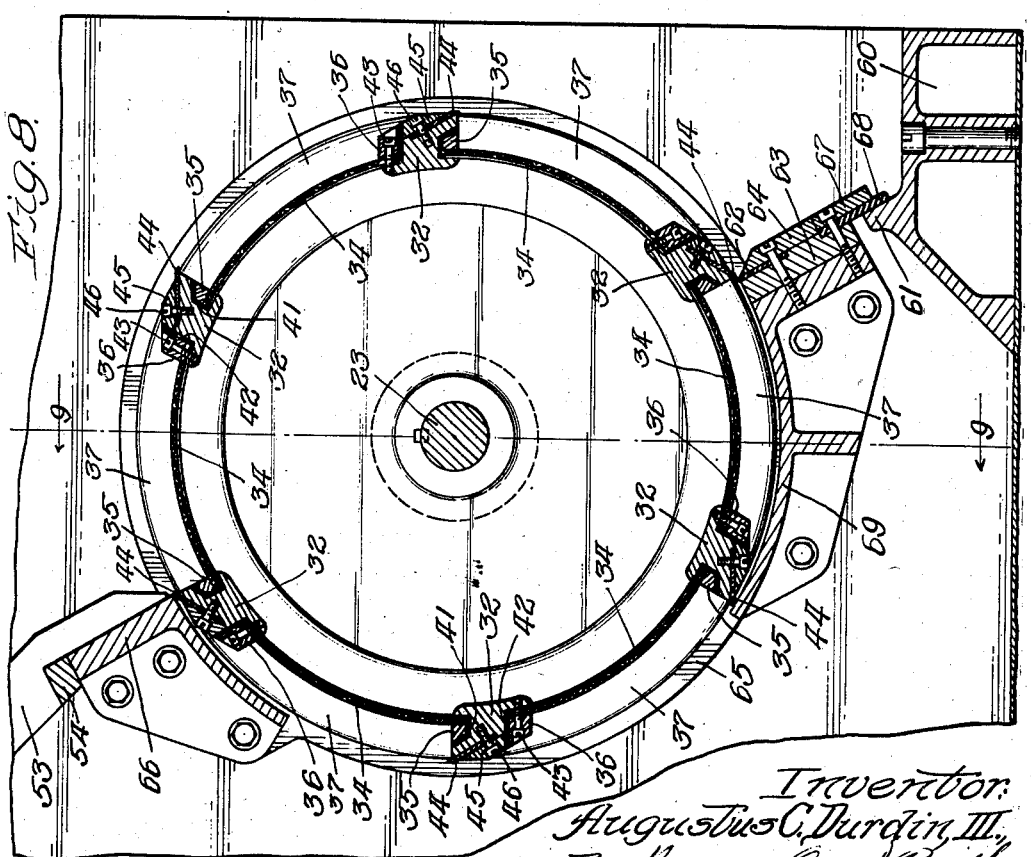

Patented June 19, 1945

2,378,757

UNITED STATES PATENT OFFICE 2,378,757

COMMINUTING METHOD AND APPARATUS

Augustus C. Durdin, III, Skokie, Ill.

Application December 22, 1941, Serial No. 423,968

24 Claims. (Cl. 210—152)

This invention relates to comminuting method and apparatus, and more particularly to a method of and apparatus for comminuting material carried by a fluid stream, such as sewage.

In the treatment of sewage, it is necessary to reduce the solids by cutting, shearing, tearing, breaking, crushing, or otherwise, into pieces small enough to be discharged into the sewage treatment plant without causing the fouling of the clarifier mechanism or clogging of the sludge pipe lines or pumps. The present invention is particularly applicable to the reduction of solids in sewage sufficiently to permit the sewage to be properly treated in the treating apparatus, although it will be apparent that the invention is applicable also to different purposes.

One of the objects of the invention is to provide a comminuting method and apparatus in which solids are screened from the flowing stream, comminuted, and returned to the downstream side of the screen. According to one important feature, the position of the screen in the stream is reversed so that the clear fluid washes the solids from the screen.

Another object of the invention is to provide a comminuting method and apparatus in which solids are screened from a flowing stream and are comminuted without being removed from the screen.

Still another object of the invention is to provide a comminuting method and apparatus in which solids are removed from a flowing stream by a rotatable cylindrical screen which carries the solids around to the downstream side and on which the solids are comminuted as the screen rotates.

Another object of the invention is to provide a comminuting apparatus including a cylindrical comminuting drum supported on bearings at both ends so that the parts can be held in proper alignment. Preferably, the drum is rotatable on a horizontal axis so that the solids are uniformly distributed thereover, and the comminuting is performed uniformly throughout the length of the drum.

Another object of the invention is to provide a comminuting apparatus which can be installed in a chamber or channel of extremely simple design, thereby reducing the initial installation cost.

Another object of the invention is to provide a comminutor in which the cutting and screening members may be easily removed and replaced in the field of operation.

The above and other objects and advantages of the invention will be more readily apparent from the following description when read in connection with the accompanying drawings, in which:

Figure 1 is a longitudinal section on the line 1—1 of Figure 2, of a comminuting apparatus embodying the invention;

Figure 2 is a section on line 2—2 of Figure 1;

Figure 3 is a partial enlarged section on the line 3—3 of Figure 1;

Figure 4 is an enlarged section on the line 4—4 of Figure 2;

Figure 5 is a partial enlarged section on the line 5—5 of Figure 1;

Figure 6 is a view similar to Figure 1 of an alternative construction;

Figure 7 is a section on the line 7—7 of Figure 6;

Figure 8 is an enlarged section on the line 8—8 of Figure 7; and

Figure 9 is an enlarged partial section on the line 9—9 of Figure 8.

Referring first to Figures 1 and 2, there is shown a comminutor chamber, indicated generally at 10, and which may conveniently be formed of any suitable material such as concrete. The chamber is substantially rectangular in form, having end and side walls and a bottom wall offset at 11 to provide a flow gradient through the chamber. An influent conduit 12 extends into one end of the chamber for conducting sewage or like material thereto, and an effluent conduit 13 communicates with the opposite end of the chamber for conducting comminuted material to any desired place for further treatment.

The chamber 10, as seen in Figure 2, is formed in its opposite sides with vertical channels 14 terminating in horizontal shoulders 15. The shoulders 15 are adapted to receive and support brackets 17 carried by frame side plates 18 partially overlying the sides of the channel. The brackets are preferably secured to the shoulders by means of foundation bolts 19 cast into the chamber. The side plates 18 and bottom plate 21 extending therebetween form a supporting framework adapted to be set into the chamber and to carry the comminuting apparatus. In accordance with this construction, the chamber may be precast and the entire comminuting apparatus may thereafter be set in the chamber as a unit. If desired for repair or replacement at any time, the entire framework can be removed from the chamber for substitution of a similar unit.

In the lower part of the framework there is rotatably mounted a drum, indicated generally at 22. The drum is supported by an axle 23 extending horizontally through the side plates and supported in bearings 24 therein, seals 25 being provided to prevent the flow of liquid to be treated into the bearings. On one end the axle 23 carries a bevel gear 26, meshing with a bevel gear 27 on the lower end of a vertical shaft 28. The shaft 28 is driven by a power unit, indicated at 29, and which may comprise an electric motor connected to the shaft, if desired, through a gear reduction unit. All of the driving mechanism as described is carried by the framework and forms a unit which may be installed and removed as described above.

The drum 22 is formed by end plates 31 rigidly connected to the shaft 23 and connected adjacent their peripheries by a series of axially extending bars 32. The bars may be braced at one or more points in their length by circumferentially extending ribs 33 lying radially inside of the bars and extending throughout the complete circumference of the drum. The space between the bars is adapted to be closed by screen sections including a perforate plate 34, which may be a woven wire screen or a solid sheet formed with perforations therethrough. On its ends the plate 34 is connected to axially extending frame members 35 and 36, which are, in turn, connected by external arcuate ribs 37. It will be noted that the ribs 37 are tapered circumferentially between the bars, for a purpose to appear later. The plate 34 may be secured to the ribs 37 by means of strips 38 underlying the ribs and connected through the plate 34 to the ribs by fastenings 39. Thus, each screen section forms a complete rigid unit which may easily be installed in the drum.

In order to connect the screen sections with the drum, each of the bars 32 is formed in one side with an elongated groove 41 adapted to receive the frame member 35. If desired, a sheet of rubber or like yielding material may be inserted in the groove to compensate for irregularities and to cushion the end of the screen unit. The other side of each bar is formed with an elongated groove 42, adapted to receive the frame member 36, which may be secured thereto by detachable fastenings such as machine screws 43. To install a screen section on the drum, it is necessary only to slip the frame section 35 into the groove 41 and thereafter to swing the frame member 36 down into the groove 42 and insert the screws 43. Thus, the drum may be assembled very quickly and easily, and the sections may readily be interchanged in case one of them becomes damaged in use.

In order that material carried around by the drum will be comminuted, the bars 32 carry cutter members. As shown, the cutter member comprises elongated flat metal strips 44, which may be cut from the type of metal stock usually employed to make hack saw blades or the like. The blades are supported by the bars 42 at an angle to the drum radius passing through the blade, and are held in place by cover strips 45 secured to the bars by machine screws 46. The outer end of each cutter blade projects slightly beyond the peripheral surface of the bar and is ground substantially tangent to the circumference of the drum to provide a sharp cutting edge. It will be apparent that these blades may be very inexpensively formed from standard stock shapes and may be adjusted in the bars by loosening the screws 46 and setting the blades in any desired position. In order to hold the blades tightly in adjusted position, suitable shims may be placed beneath them, if preferred. The blades 44 cooperate with a fixed blade 47 which is similarly formed and is supported on a cross-piece 48 bolted to the opposite side plates 18, and forming therewith a part of the supporting frame. The blade 47 may be clamped on the cross-piece 48 by means of a strip 49 secured to the cross-piece by machine screws or the like.

In order to provide a gradual shearing action between the blades, either the blades 44 or the blade 47, or both, may be helically shaped to extend around the drum. This features is illustrated in Figure 3, in which the blade 47 is shown as having a helical curve. This shape may be very simply obtained by bending the strip 47 to the desired curvature and grinding the edge thereof.

Flow of fluid below the drum is prevented by means of a plate 51 having a cylindrical upper surface 52, and mounted on the bottom plate 21 below the drum. The surface 52 is shaped to clear the edges of the blades 44 relatively closely, so as substantially to prevent the flow of fluid between the plate and blades, and effectively to seal the lower portion of the drum.

In the event of unusually high levels of liquid in the conduits, the drum might be overflowed so that large particles of material might be carried over into the treating apparatus. To prevent this, a grate 53 is provided above the drum, supported by a cross-bar 54 adjacent the cross-member 48 and a second cross-bar 55 near the upper end of the chamber. The grate preferably overlaps the cross-bar 48 and extends substantially to the top of the chamber. In the event of unusually high liquid levels, any large particles carried by the liquid will be caught by the grate and dropped on to the drum to be comminuted between the blades 44 and 47 before passing to the downstream side of the drum. If desired, a solid plate may be used in place of a grate or screen so that all liquid must pass through the screen. The frame may be additionally braced by one or more cross-bars 56 secured between the side plates 18, to make the frame more rigid.

In operation, sewage or other material flowing into the chamber through the influent pipe 12 is intercepted by the drum and has the solids strained therefrom by the screen plates 34. These plates may be made of any desired size to permit the passage of particles less than a predetermined size, the small particles and clear liquid flowing through the screen and diametrically through the drum. In this application, the mixture of clear liquid and small particles passing the screen has been referred to throughout as "clear liquid," it being understood that this term is not limited to a liquid which is completely free of solid particles.

The solid particles strained from the liquid collect on the outer surface of the screens 34 between the ribs 37, the ribs preventing damage to the screens by any large articles striking against them. This material is carried up over the drum as the drum rotates, and is cut or chopped between the blades 44 and 47 at the top of the drum. It will be apparent that the minimum particle size can easily be determined by adjusting the width of the ribs 37 and the space between the cutting edges of the blades 44 and the screens 34. Due to the tapered construction of the ribs 37, the solid material is permitted to wipe more easily over the ribs to permit a regulated accumulation of material to be moved by the drum to the stationary cutter. As the drum turns over, the comminuted particles still carried in the recesses defined between the ribs 37 and above the screens pass to the downstream side of the drum, and are washed from the screen by the clear liquid flowing out from the interior of the drum. The liquid stream containing the comminuted solid material then flows from the chamber through the effluent pipe 13 to any desired point for further treatment.

In order to adjust or replace the cutter members or screens, it is necessary only for an operator to enter the top of the chamber 10, from which point he has access to the drum and the cutter blade 47. By rotating the drum any desired portion thereof may be exposed so that worn blades may be re-adjusted or replaced, and so that damaged screens may be removed and replaced. In the event that the unit is seriously damaged to the point of incapacitating it, the entire unit may be removed by releasing nuts on the anchor bolts 19 and lifting the frame from the chamber 10.

The construction shown in Figures 6 to 9 is substantially similar in many respects to that of Figures 1 to 5, and parts therein corresponding to like parts in the first figures have been indicated by the same reference numerals.

The drum in this construction is identical with that in the first figures, except that it is rotated in the opposite direction, and the angle of the knives 44 is reversed. In this figure, the ribs 37 are shown of uniform height throughout instead of tapered, this construction being less expensive and highly satisfactory for most types of material. Also, the seal plate 51 is omitted and has substituted therefor a stop plate 60 having an edge bar 61 extending transversely across the channel at its lower portion.

In this construction, the cutting is adapted to be performed near the bottom of the channel, below the surface of the fluid stream, between the knives 44 and a cutter blade 62 carried by a transverse frame member 63, and held in place thereon by a bar 64. The frame member 63 is supported between a pair of end discs 65 rotatably mounted coaxial with the drum shaft 23 and lying beside the drum. Opposite the bars 63, the discs 65 carry a second transverse bar 66, the two discs and the two bars forming a framework rotatable around the axis of the drum.

The cutter 62 is adapted to have its rotation limited by engagement with the edge bar 61, and for this purpose a transverse plate 67 is provided connected to the transverse member 63. Preferably, a gasket of rubber or like material 68 is carried by the under side of the plate 67 to engage the edge bar 61 to seal the space therebetween against the flow of liquid.

In order to seal the space between the drum and the cutter bar to prevent flow of any material therethrough, except that which passes the bar, an arcuate plate 69 is provided extending between the end plate 65 and lying on the downstream side of the cutter blade 62. This plate is adapted to lie closely adjacent the cutter blades 44, effectively to seal the flow of material therebetween except for that which lies between the ribs 37.

In operation, this embodiment is substantially the same as that of Figures 1 to 5, except that instead of carrying the solid material above the surface of the liquid, the drum carries the material down through the liquid and comminutes it below the stream surface. For purposes of replacement, adjustment or the like on the blade 62, the frame formed by the end plates 65 and the cross members 63 and 66 may be swung around the drum axis to present the blade 62 at the upper portion of the drum. An operator may therefore make any necessary adjustments or replacements without removing any of the mechanism from the chamber and without being required to descend to the bottom of the chamber.

In both embodiments, when the drum axis is horizontal, solid material suspended in the sewage stream will be uniformly distributed over the full surface of the drum, so that wear on the cutter blades will be substantially uniform throughout. It will be understood, of course, that the drum could be mounted with its axis vertical if desired. Furthermore, in both constructions, solid material collected on the screens will be flushed therefrom at the downstream side of the drum by clear liquid flowing through the screens and substantially diametrically through the drum. Thus, the drum will be kept clean at all times, and the material will pass rapidly therethrough, all solid particles being reduced to a predetermined maximum particle size before being permitted to reach the downstream side of the mechanism. With this construction, there are no pockets or dead spaces in which solid material can accumulate, the material all being actively processed and moved through the device with a minimum of delay.

In the embodiment of Figures 1 to 5, any material not immediately comminuted will remain on top of the drum and be worked gradually to the desired particle size before being carried over. In the embodiment of Figures 6 to 9, any particles tending to collect will be immediately picked up again by the incoming stream and carried to the surface of the drum to be acted on by the comminuting mechanism.

While two embodiments of the invention have been shown and described in detail, it will be understood that many changes might be made therein without departing from the spirit of the invention. For example, individual cutters might be employed on the drum bars for cooperation with a slotted stationary bar and many other changes in details of the structure could be made. The embodiments shown, therefore, are intended to be illustrative only and are not to be taken as a definition of the scope of the invention, reference being had for this purpose to the appended claims.

What is claimed is:

1. The method of comminuting material carried by a stream of flowing fluid which comprises causing the stream to flow substantially diametrically through a cylindrical screen from an upstream face thereof through a downstream face thereof, separating solid material from the fluid on the outer surface of the screen, collecting the separated material in pockets on the screens, cutting off material projecting above the pockets, rotating the screen, and causing the fluid flowing out through the screen on the downstream side to flush the material from the screen.

2. The method of comminuting sewage in a flowing stream which comprises causing the stream to flow substantially diametrically through a cylindrical screen from an upstream face thereof through a downstream face thereof, separating solid material from the sewage and collecting said material in pockets on the outer surface of the screen, comminuting the separated material while on the outer surface of the screen to a size larger than the interstices of the screen, rotating the screen about a horizontal axis so that the comminuted material will be carried around the screen on the outside thereof without passing through the screen, and causing the liquid flowing out through the screen on the downstream side to flush the comminuted material from the outside of the screen into the flowing stream.

3. The method of comminuting a flowing stream of sewage in a channel comprising collecting solid material from the stream on a screen, moving a portion of the screen with the solid material thereon out of the stream of sewage, comminuting the material on the removed portion of the screen without removing it from the screen, and returning the portion of screen with the comminuted material thereon to the stream in such a way that the material is on the downstream side of the screen so that the stream flowing through the screen will flush the sewage therefrom.

4. The method of comminuting a flowing stream of sewage in a channel comprising collecting solid material from the stream in pockets on a screen, comminuting the material on the screen to a size larger than the interstices of the screen without removing the material from the stream, and reversing the screen in the stream without removing it therefrom so that the stream will flush the comminuted material from the screen.

5. Comminuting apparatus comprising a cylindrical drum having closed ends and perforate side portions means forming open pockets on the periphery of the drum, means for directing a fluid stream substantially diametrically through the drum so that solid material will collect in the pockets on the perforate side portions, means for rotating the drum, cutting means on the drum, and a stationary cutter member mounted adjacent the periphery of the drum and cooperating with the cutting means to comminute the solid material collected on the drum.

6. Comminuting apparatus comprising a cylindrical drum having closed ends and perforate side portions, means for directing a fluid stream substantially diametrically through the drum so that solid material will collect on the perforate side portions, means for rotating the drum, a plurality of axially extending cutter members carried by the drum on its periphery, and a stationary cutter blade cooperating with the axially extending blades to comminute the solid material collected on the drum.

7. Comminuting apparatus comprising a cylindrical drum having closed ends and perforate side portions, means for directing a fluid stream substantially diametrically through the drum so that solid material will collect on the perforate side portions, means for rotating the drum, axially extending bars at the periphery of the drum projecting beyond the outer surface of the perforate portions, elongated cutter blades carried by said bars, and a fixed cutter blade cooperating with the said cutter blades to comminute material collected on the drum as the drum is rotated.

8. Comminuting apparatus comprising a channel, a cylindrical drum having closed ends and perforate side portions mounted on a horizontal axis in the channel, means for directing a fluid stream substantially diametrically through the drum from an upstream face thereof through a downstream face thereof so that solid material will collect on the perforate side portions, means for rotating the drum in a direction to raise its upstream face so that collected material will be carried over the top of the drum cutting means on the drum, and a cutter blade mounted adjacent the upper portion of the drum and cooperating with the cutting means to comminute solid material carried over the top of the drum.

9. Comminuting apparatus comprising a channel, a cylindrical drum having closed ends and perforate side portions mounted on a horizontal axis in the channel, means for directing a fluid stream substantially diametrically through the drum from an upstream face thereof through a down stream face thereof so that solid material will collect on the perforate side portions, means for rotating the drum in a direction to raise its upstream face so that collected material will be carried over the top of the drum, a plurality of axially extending cutter members carried by the drum and projecting beyond the surface thereof, and an elongated cutter member mounted adjacent the upper portion of the drum and cooperating with said cutter members to comminute material carried over the top of the drum.

10. Comminuting apparatus comprising a channel, a cylindrical drum having closed ends and perforate side portions mounted on a horizontal axis in the channel, means for directing a fluid stream substantially diametrically through the drum from an upstream face thereof through a down stream face thereof so that solid material will collect on the perforate side portions, means for rotating the drum in a direction to raise its upstream face so that collected material will be carried over the top of the drum, a plurality of axially extending cutter members carried by the drum and projecting beyond the surface thereof, an elongated cutter member mounted adjacent the upper portion of the drum and cooperating with said cutter members to comminute material carried over the top of the drum, and a plate having a section of a substantially cylindrical surface mounted at the lower part of the drum and cooperating with the cutter members to restrict flow of fluid around the lower part of the drum.

11. Comminuting apparatus comprising a channel, a cylindrical drum having closed ends and perforate side portions mounted on a horizontal axis in the channel, means for directing a fluid stream substantially diametrically through the drum from an upstream face thereof through a down stream face thereof so that solid material will collect on the perforate side portions, means for rotating the drum in a direction to lower its upstream face so that collected material will tend to be carried around below the drum, and an elongated cutter member mounted adjacent the lower portion of the drum and cooperating therewith to comminute material carried around the drum.

12. Comminuting apparatus comprising a channel, a cylindrical drum having closed ends and perforate side portions mounted on a horizontal axis in the channel, means for directing a fluid stream substantially diametrically through the drum from an upstream face thereof through a down stream face thereof so that solid material will collect on the perforate side portions, means for rotating the drum in a direction to lower its upstream face so that collected material will tend to be carried around below the drum, a plurality of axially extending cutter members carried by the periphery of the drum and projecting beyond the perforate surface thereof, and an elongated cutter member mounted adjacent the lower portion of the drum and cooperating with the first-named cutter members to comminute material carried around the drum.

13. Comminuting apparatus comprising a cylindrical drum having closed ends and perforate side portions, means for directing a fluid stream substantially diametrically through the drum so that solid material will collect on the perforate side portions, means for rotating the drum, a frame rotatably mounted coaxially with the drum, an elongated cutter member carried by said frame and overlying the cylindrical surface of the drum, and stop means to limit rotary movement of the frame.

14. Comminuting apparatus comprising a cylindrical drum having closed ends and perforate side portions, means for directing a fluid stream substantially diametrically through the drum so that solid material will collect on the perforate side portions, means for rotating the drum, a frame rotatably mounted coaxially with the drum, an elongated cutter member carried by said frame and overlying the cylindrical surface of the drum, and an elongated stop member spaced from the drum and engageable with the cutter member to limit rotary movement of the frame and cutter member and to seal the space around the cutter member against the flow of fluid.

15. In a comminuting apparatus, means forming a channel for fluid flow, a frame including side plates supported in the channel, a drum rotatably supported on a horizontal axis on the side plates, means for driving the drum, means forming perforate side portions in the drum so that solid material carried by the fluid will be collected on the outer surface of the drum and the clear fluid will flow substantially diametrically therethrough, and cutter means cooperating with the drum to comminute solid material carried by the drum as the drum is rotated.

16. In a comminuting apparatus, a drum having a plurality of axially extending bars at its periphery, means forming perforate wall portions between the bars peripherally extending strips between the bars cooperating therewith to form pockets, cutter means carried by the bars and having exposed cutting edges at the outside of the bars and a stationary cutter bar adjacent the periphery of the drum cooperating with said cutter means to comminute material collected from the drum.

17. In a comminuting apparatus, a drum having a plurality of axially extending bars at its periphery, means forming perforate wall portions between the bars, elongated cutter blades formed of thin metal strips secured to the bars with one edge of each strip projecting beyond the periphery of the corresponding bar and a stationary cutter bar adjacent the periphery of the drum cooperating with said cutter blades to comminute material collected on the drum.

18. In a comminuting apparatus, a drum having a plurality of axially extending bars at its periphery, means forming perforate wall portions between the bars, elongated metal strips lying along the bars with the radial width of each strip at an angle to a drum radius passing through the strip, and with one edge of the strip projecting beyond the periphery of the bar, clamping means securing the strips to the bars and a stationary cutter bar adjacent the periphery of the drum cooperating with said strips to comminute material collected on the drum.

19. In a comminuting apparatus, a drum having a plurality of axially extending bars at its periphery, means forming perforate wall portions between the bars, elongated cutter blades carried by the bars, and a fixed cutter blade mounted adjacent the periphery of the drum and cooperating with the first-named cutter blades, one of the cutter blades having a helical cutting edge to provide a gradual shearing action between the cooperating blades.

20. In a comminuting apparatus, a drum having a plurality of axially extending bars at its periphery, means forming perforate wall portions between the bars, cutter blades carried by the bars, a cutter bar adjacent the periphery of the drum cooperating with said cutter blades, and circumferentially extending ribs overlying the perforate wall portion between the bars and of less radial extent than the cutter blades.

21. In a comminuting apparatus, a drum having a plurality of axially extending bars at its periphery, means forming perforate wall portions between the bars, cutter blades carried by the bars a cutter bar adjacent the periphery of the drum cooperating with said cutter blades, and circumferentially extending ribs overlying the perforate wall portion between the bars and of less radial extent than the cutter blades, said ribs being tapered in width from one bar to the next.

22. In a comminuting apparatus, a drum having a series of axially extending bars at its periphery and being open for fluid flow between the bars, a plurality of arcuate screen sections fitting between the bars and forming perforate cylindrical walls for the drum, axially extending frame members at the ends of the screen sections, each of the bars having a groove in one side to receive one of the frame members, and means detachably to secure the other frame member of a screen section to an adjacent bar.

23. In a comminuting apparatus, a drum having a series of axially extending bars at its periphery and being open for fluid flow between the bars, a plurality of arcuate screen sections fitting between the bars and forming perforate cylindrical walls for the drum, each of said screen sections including axially extending frame members at its opposite ends and circumferential external ribs between the frame members, and means to secure the screen sections between the bars.

24. In a comminuting apparatus, a drum having a series of axially extending bars at its periphery and spaced circumferential ribs between the bars, a plurality of arcuate screen sections between the bars overlying the ribs, each of the screen sections including axial frame members at its ends and circumferential external ribs between the frame members, and means to secure the screen sections to the drum with the frame members engaging the bars and the ribs of the screen section overlying the ribs of the drum.

AUGUSTUS C. DURDIN, III.